Oct. 2, 1962 R. A. WARREN ETAL 3,056,849
PRIMARY CELL WITH SLURRY ELECTROLYTE-ANODE BODY
Filed April 7, 1959

Inventors,
Robert A. Warren,
Joseph J. Coleman
and Milton E. Wilke,
By: Jones Darbo & Robertson, Attys.

United States Patent Office 3,056,849
Patented Oct. 2, 1962

3,056,849
PRIMARY CELL WITH SLURRY ELECTROLYTE-ANODE BODY
Robert A. Warren, Joseph J. Coleman, and Milton E. Wilke, Freeport, Ill., assignors to Servel, Inc., Evansville, Ill., a corporation of Delaware
Filed Apr. 7, 1959, Ser. No. 804,784
9 Claims. (Cl. 136—83)

This application relates to primary cells and more particularly refers to a primary cell having a novel combined anode and electrolyte herein termed an "electrolyte-anode."

Anodes for primary cells have traditionally been constructed either of solid metal such as sheet metal or of metal powder formed into an integral self-supporting unit by compressing, sintering or embedding in a resin or gel.

It is an object of the present invention to provide a composition which may be used to form a combined anode and electrolyte member for a primary cell.

It is a further object to provide such a composition which, being not self-supporting, may be poured into the enclosure of the primary cell.

It is still further an object of the invention to provide a primary cell having a combined electrolyte-anode body which cell may be easily fabricated by mass production methods.

It is a further object to provide such a primary cell which is capable of operating at a high current drain and which has high anode efficiency.

Figure 1:
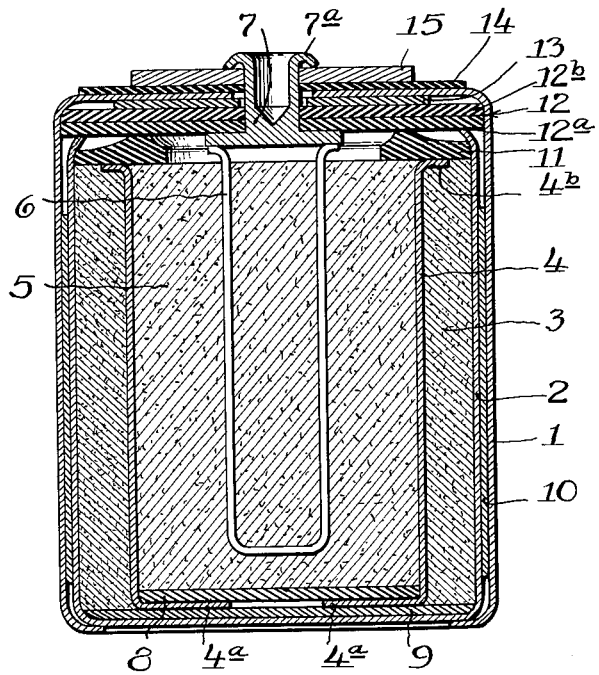
Figure 2:
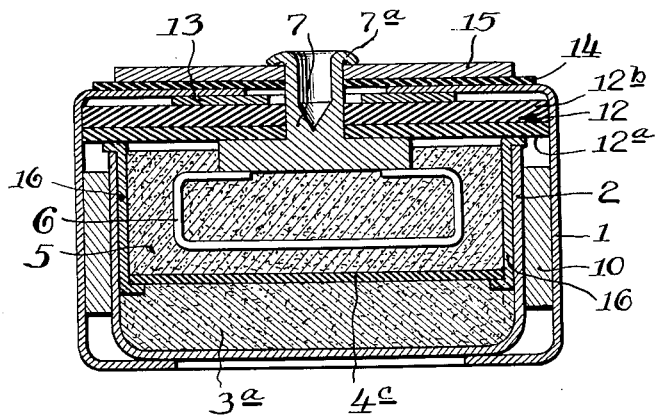

Other objects and advantages of the present invention will become apparent from the description which follows and from the accompanying drawing, in which:

FIG. 1 is a vertical section of an alkaline primary cell incorporating the electrolyte-anode member of the present invention, and FIG. 2 is a vertical section of a modified form of the cell.

According to the present invention, a slurry is prepared by mixing together anode metal particles, particles of a bibulous material of larger than colloidal size, and a primary cell electrolyte. The slurry is then introduced into the cell container where it functions both as the cell anode and as the cell electrolyte-containing member.

Referring to the drawing, FIG. 1 illustrates a common cylindrical cell structure of shape and dimensions suitable for use with flashlights, photographic flash guns, and portable radios. The enclosure for the cell is comprised of a pair of oppositely nested steel cans, an outer can 1 and an inner can 2. Contained immediately within the inner can 2 is a hollow cylindrical depolarizer member 3. A body 5 forming a combined electrolyte-anode component in the form of a slurry at the central portion of the cell is separated from the depolarizer by a water- and ion-permeable barrier 4 of an alkali-resistant material. Disposed within the electrolyte-anode slurry 5 is a negative electrode 6 in the form of a wire loop for the purpose of establishing electrical connection with the anode slurry. The electrode 6 is connected to an external negative terminal 7 by any suitable method such as soldering or welding. An insulating disc 8 of polystyrene serves to contain the slurry. The lower margin 4a of the barrier is turned in and folded about this disc, the barrier and the disc cooperating to form an enclosure for the slurry. Separating the inturned margin of the barrier 4a from the bottom of the inner can 2 is a polyethylene washer 9. A cardboard sleeve 10 separates the inner and outer cans and serves to absorb any electrolyte which might leak out of the inner can 2.

A polyethylene washer 11 lies over an out-turned edge of the barrier 4b and prevents the anode slurry from making contact with the depolarizer cylinder and with the inner can.

An airtight seal is provided for the cell by a sub-assembly which is made integral with the outer can. In addition to the outer can, the sub-assembly is comprised of a laminated washer 12 of a layer 12a of resilient material such as neoprene, and a layer 12b of a substantially rigid material such as phenolic resin reinforced by a fabric. The lip of the inner can 2 is turned in somewhat to permit better engagement with the face of the resilient layer 12a. A venting spider 13 of a substantially rigid material such as steel or polystyrene, an insulating washer 14 of a material such as mylar, and a metallic terminal contact washer 15 complete the sub-assembly which is affixed to the bottom of the outer can by upsetting the end 7a of the rivet 7. The venting spider provides precision control of venting pressure, and is disclosed and claimed in pending application Serial No. 665,953, now Patent No. 2,934,584, of Robert A. Warren, Milton E. Wilke and Joseph J. Coleman, filed June 17, 1957, for Alkaline Cell Having Controlled Vents. In order to prevent leakage around the sides of the venting spider 13, it is preferred that a ring of adhesive be placed on both faces of the spider to seal it to the surfaces of the members with whose surfaces it is contiguously engaged.

FIG. 2 illustrates a structure similar to that shown in FIG. 1, but where the depolarizer member 3a is in the form of a compressed disc positioned at the bottom of the inner can 2, rather than in the form of a hollow cylinder. As a further departure, the barrier 4c is in the form of a disc which may be composed of the same fabric as used for the barrier of FIG. 1. Alternatively, it may be composed of any other suitable barrier material disclosed in the art. The barrier 4c lies immediately over the depolarizer member. In order to prevent the anode slurry 5 from making contact with the inner can 2 and thereby causing the cell to short out, an insulating sleeve 16 of a material such as polystyrene, polyethylene or neoprene is placed inside the inner can, having its upper lip turned over the inner can lip, and its lower lip turned under the barrier 4c. The structure illustrated in FIG. 2 is especially adaptable for use in cells which have a shorter length in comparison to their diameter than that of the structure of FIG. 1.

The electrolyte-anode composition, according to the invention, is prepared in the form of a slurry and is comprised of the desired anode metal in powder form, particles of a bibulous material wherein the particles are larger than colloidal particle size, and an electrolyte which may be chosen from among those commonly used in primary batteries.

The preferred anode metal is zinc in the form of a powder, although other suitable anodic metals may be used. Prior to incorporation into the slurry, the zinc powder is preferably amalgamated by a suitable method in order to prevent its excessive dissolution in the electrolyte of the cell.

Any bibulous material which is not adversely affected by the particular electrolyte may be utilized for preparing the present electrolyte-anode slurry. The preferred material is fibrous cellulose such as that available in the form of a bleached pulp containing about 90% alpha cellulose and minor amounts of beta and gamma celluloses. Cellulose sponge is also suitable, as are other forms of cellulose which have the ability to absorb liquid. In addition to cellulose, other bibulous material such as mineral fibers, etc. may be used. Prior to its introduction in the slurry, the bibulous material is reduced to small particle size by any suitable means such as cutting, shredding or chopping. For the purposes of the present invention, it is necessary that the particle size of the bibulous material be greater than colloidal size in order that an immobilizing gel will not be formed.

The electrolyte may be chosen from among any of the electrolytes which are suitable for the particular electro-chemical system used. A suitable alkaline electrolyte for the cells described above may have the following composition:

|  | Percent |
|---|---|
| KOH | 28 |
| ZnO | 6 |
| H$_2$O | 66 |

The ZnO dissolves in the electrolyte to form potassium zincate which acts as an inhibiting agent to protect the zinc anode from dissolution in the electrolyte during the period when no current is drawn from the cell.

Suitable relative proportions of the ingredients of the electrolyte-anode slurry composition may be chosen as follows:

|  | Percent |
|---|---|
| Electrolyte | 38.2 |
| Cellulose | 6.4 |
| Zinc powder | 55.4 |

The relative proportions may be varied considerably from that indicated while still obtaining satisfactory results.

The depolarizing agent may be any of the easily reduceable metal oxides commonly used in the art, such as manganese dioxide, mercuric oxide, silver oxide, and copper oxide. Where relatively non-conductive materials are used, as for example, manganese dioxide or mercuric dioxide, a minor proportion of a conductive material such as graphite or a carbon black such as acetylene black should be added in order to impart good conductivity to the depolarizing member. Where silver oxide is used, it is sufficiently conductive so that a conductive compound need not be added. Suitable depolarizer mixtures may be prepared by mixing together about nine parts manganese dioxide and one part finely divided graphite, or about ten parts mercuric oxide and one part graphite. For particular applications, such as where low current drain is permissible, a carbon black such as acetylene black may be substituted for the graphite. The depolarizer mixture is molded under pressure to form a depolarizer member, such as that shown as the hollow cylindrical member 3 of FIG. 1 or as the disc 3a of FIG. 2. Where the cylindrical form is used, its dimensions are so chosen that a tight press fit will result when it is inserted in the inner can 2. This results in good electrical contact between the depolarizer and the can. Where the disc form is used, such as in FIG. 2, the depolarizer member is preferably either compressed into the bottom of the can, or else, inserted into the can as a pellet and cemented to the can by means of a conductive adhesive composition such as a mixture comprised of a major proportion of silver powder and a minor proportion of wax.

The barrier 4 is composed of a material resistant to the electrolyte, and one which is sufficiently porous to allow the electrolyte to pass therethrough, but yet which will prevent the mixing of the anode slurry with the depolarizer material.

A preferred barrier material is a fabric comprised of 75% nylon and 25% Dynel (a copolymer of vinyl chloride and acrylonitrile) having a thickness when compressed of .002–.003 inch. Other porous materials not adversely affected by the electrolyte may also be used.

The negative electrode 6 serves as a conductor or electron collector between the electrolyte-anode slurry and the terminal rivet 7. It should be disposed well into the slurry in order to provide low internal cell resistance. The electrode may be comprised of a steel wire which is tin plated or nickel plated to prevent reaction with the electrolyte. Its extremities may be soldered or welded to the rivet 7.

The cell shown in FIG. 1 is assembled by first inserting the polystyrene disc 9 into the bottom of the inner can. The depolarizer cylinder 3 is then forced into the can. The barrier 4 is formed by cutting a small sheet of the material to size, winding two turns thereof on a mandrel, and inserting the tube thus formed into the hollow space of the depolarizer cylinder. The bottom edge 4a of the barrier is folded inward toward the axis of the can, and the polyethylene disc 8 placed thereover. The polyethylene disc and the turned-in edge of the barrier cooperate to form a retentive bag. The electrolyte-anode slurry is then poured or tamped into the barrier bag. The upper edge 4b of the barrier is turned outward and a polyethylene washer 11 placed thereover, completely separating the depolarizer cylinder from the electrolyte-anode slurry. The lip of the inner can 2 is then slightly crimped inward in order to retain the washer 11 and to provide better engagement with the laminated sealing washer 12.

The cardboard sleeve 10 is next placed over the inner can, and the outer can and terminal sub-assembly placed thereover. Sealing of the cell is accomplished by crimping the lip of the outer can over the bottom of the inner can. This causes an axial force to compress the resilient sealing disc 12a against the lip of the inner can to form an airtight closure for the cell.

The cell of FIG. 2 is assembled in much the same way as that of FIG. 1, except that the depolarizer pellet is first inserted into the bottom of the inner can either by compression or by cementing, as described above. The insulating sleeve 16 is inserted into the inner can with its lower edge resting on the depolarizer. The barrier is then inserted into the sleeve 16, its edge being supported by the lower edge of the sleeve, and its lower face being in contact with the depolarizer. The electrolyte-anode slurry is poured into the cup formed by the sleeve 16 and the barrier 4c. The cardboard sleeve 10 is placed over the inner cup and the outer cup assembly placed thereover, in a manner similar to that described with respect to FIG. 1. The lip of the outer cup is then crimped about the inner cup bottom to provide axial sealing force for the sealing disc which, in the cell shown in FIG. 2, seals against the lip of the insulating sleeve. Alternative arrangements may, of course, be used.

Cells produced according to the present invention have exhibited high capacity, excellent shelf life, and high anode efficiency. They may be easily and inexpensively fabricated, since the electrolyte-anode slurry may be readily poured or tampered into the cell or into the bag-like container which also acts as a barrier to prevent the migration of cathodic material or by-products therefrom into the electrolyte-anode mixture. The loose anode metal particles present a large surface area to the electrolyte, and, as a result, the cell is capable of sustained high current drains and high anode efficiency. Since the functioning of the anode is not dependent upon its remaining in an integral unit, cell failure because of anode perforation or disintegration is eliminated. Moreover, the use of anode metal particles per se instead of an integral anode eliminates the need for pelletizing or sintering, operations which add appreciably to the cost of the cell.

Although the present invention has been described in detail only in relation to several specific embodiments, it is of course to be understood that many variations may be practiced by those skilled in the art without departing from the spirit or scope thereof within the limits defined by the appended claims.

What is claimed is as follows:

1. A primary cell comprising a cell container and having disposed therein a depolarizer member comprised of a major proportion of an easily reducible metal oxide and a minor proportion of finely divided carbon particles, and a combination electrolyte-anode member comprised of a slurry of anode metal particles, particles of a bibulous material of greater than coloidal size, and an electrolyte, and an ionically permeable barrier interposed between said depolarizer member and said electrolyte-anode member having one surface in contact engagement with said depolarizer member and the other surface in contact engagement with said electrolyte-anode member.

2. A primary cell according to claim 1 wherein said easily reducible metal oxide is manganese dioxide.

3. A primary cell according to claim 1 wherein said easily reducible metal oxide is mercuric oxide.

4. A primary cell according to claim 1 wherein said bibulous material is cellulose.

5. A primary cell according to claim 1 wherein a major proportion of said bibulous material is alpha cellulose.

6. A primary cell according to claim 1 wherein said anode metal particles are zinc.

7. A primary cell according to claim 1 wherein said bibulous material is cellulose sponge.

8. A primary cell comprising a cylindrical metal container, and having disposed therein and in contact with the side thereof a depolarizer member in the form of a compressed hollow cylinder and comprised of a major proportion of an easily reduceable metal oxide and a minor proportion of finely divided carbon, a combination electrolyte-anode member disposed within said hollow anode comprised of a slurry of anode metal particles, particles of a bibulous material of greater than colloidal size, and an electrolyte, and having an ionically permeable barrier interposed between said depolarizer member and said electrolyte-anode slurry.

9. A primary cell according to claim 8 wherein said bibulous material is comprised of fibrous cellulose and said electrolyte is comprised of an aqueous solution of an alkali metal hydroxide.

References Cited in the file of this patent

UNITED STATES PATENTS

| | | |
|---|---|---|
| 548,120 | Gomess | Oct. 15, 1895 |
| 1,829,110 | Richter | Oct. 27, 1931 |
| 2,328,749 | Sherrard | Sept. 7, 1943 |
| 2,462,998 | Ruben | Mar. 1, 1949 |
| 2,480,839 | Daniel | Sept. 6, 1949 |
| 2,483,983 | Quinnell | Oct. 4, 1949 |
| 2,593,893 | King | Apr. 22, 1952 |
| 2,678,961 | Uhlig et al. | May 18, 1954 |
| 2,723,301 | West et al. | Nov. 8, 1955 |
| 2,824,165 | Marsal | Feb. 18, 1958 |
| 2,882,331 | Zenczak | Apr. 14, 1959 |